United States Patent
Joshi et al.

(10) Patent No.: US 11,986,759 B2
(45) Date of Patent: May 21, 2024

(54) ELECTROSTATIC AIR FILTER FOR ELECTRIC VEHICLE MOTORS

(71) Applicant: Toyota Motor Engineering & Manufacturing North America, Inc., Plano, TX (US)

(72) Inventors: Shailesh N. Joshi, Ann Arbor, MI (US); Ryohei Tsuruta, Ann Arbor, MI (US); Umesh Gandhi, Farmington Hills, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 403 days.

(21) Appl. No.: 17/107,504

(22) Filed: Nov. 30, 2020

(65) Prior Publication Data

US 2022/0168680 A1 Jun. 2, 2022

(51) Int. Cl.
| | |
|---|---|
| *B01D 46/00* | (2022.01) |
| *B01D 46/42* | (2006.01) |
| *B60K 7/00* | (2006.01) |
| *B60K 13/02* | (2006.01) |
| *B60K 13/04* | (2006.01) |

(52) U.S. Cl.
CPC ..... *B01D 46/0032* (2013.01); *B01D 46/4245* (2013.01); *B60K 7/0007* (2013.01); *B60K 13/02* (2013.01); *B60K 13/04* (2013.01); *B01D 2279/40* (2013.01)

(58) Field of Classification Search
CPC ............ B01D 46/0032; B01D 46/4245; B01D 2279/40; B01D 46/48; B01D 35/06; B01D 46/50; B60K 7/0007; B60K 13/02; B60K 13/04; B60B 19/006; F01P 11/12
USPC .......................................................... 97/57
See application file for complete search history.

(56) References Cited

U.S. PATENT DOCUMENTS

| | | | |
|---|---|---|---|
| 6,592,642 B2 | 7/2003 | Maricq et al. | |
| 10,286,882 B2 | 5/2019 | Mathissen et al. | |
| 2011/0162526 A1* | 7/2011 | Tatsumi | B03C 3/08 47/20.1 |

FOREIGN PATENT DOCUMENTS

| | | | |
|---|---|---|---|
| CN | 204329241 U | * | 5/2015 |
| CZ | 26945 U1 | * | 2/2014 |
| DE | 102016217387 A1 | | 9/2016 |
| KR | 20200045284 A | | 5/2001 |
| KR | 20110006918 A | * | 1/2011 |
| KR | 20110095667 A | * | 8/2011 |
| KR | 20190045437 A | | 10/2017 |
| KR | 20200045284 A | * | 5/2020 |

* cited by examiner

*Primary Examiner* — Robert A Hopkins
(74) *Attorney, Agent, or Firm* — Haynes and Boone, LLP (57) ABSTRACT

Disclosed is a vehicle comprising a wheel with an associated air-cooled motor, and a ventilation path for passing outside air from outside the vehicle into the motor. An electrostatic device is disposed proximate to the ventilation path. When the electrostatic device is energized, particles or debris in the outside air are attracted toward or repelled from the electrostatic device, such that the particles or debris are removed from the outside air before the outside air enters the motor.

13 Claims, 6 Drawing Sheets

ELECTROSTATIC AIR FILTER FOR ELECTRIC VEHICLE MOTORS

TECHNICAL FIELD

The subject matter described herein relates to an electrostatic air filter for electric motors. This electrostatic air filter has particular but not exclusive utility for wheel motors used in cars and trucks.

BACKGROUND

Electric motors generate heat, which must be removed from the motor to prevent damage or degradation associated with overheating. Running an electric motor 10° C. above its rated operating temperature can reduce its operational lifetime by as much as 50%, while running the motor above a critical failure temperature can cause the motor to cease functioning entirely. Overheating can also reduce the energy efficiency, power output, or torque of an electric motor, or cause a shutdown of the motor. Thus, it is desirable to cool the motor during operation.

Cooling may be accomplished through the use of radiative fins. However, the geometry of electric motors may be irregular, and heat generation within the motor structure may be non-uniform. Thus, radiatively cooled motors may suffer from hot spots. This problem can be mitigated through the use of air cooling, either through natural convection or through forced air cooling. Some air-cooled motors draw cool outside air into the motor, circulate it within the motor housing, and expel heated exhaust air in order to remove heat from the motor components.

Some automotive wheels have integrated electric motors. For example, a two-wheel-drive electric or hybrid vehicle may incorporate independent electric motors on two of four wheels, whereas a four-wheel-drive electric or hybrid vehicle may incorporate electric motors into each of four wheels. These motors must be cooled, such as by air cooling, for efficient operation of the motor. Air from the external environment is drawn in through the wheel and passed to the motor. However, outside air may contain debris and contaminants which may damage the motor and/or impede air flow through the motor. This problem can be addressed, at least partially, by flowing the intake air through a fibrous or porous filter. However, debris and particles can become lodged in the fibers or pores of the filter over time, thus reducing air flow and requiring replacement of the filter. In addition, air flow through such filters may be restricted when the filter materials are wet, as may occur during rainy conditions.

It should be understood that current wheel motor cooling systems have numerous drawbacks, including but not limited to reduced airflow and the ingestion of damaging material. Accordingly, a need exists for improved wheel motor cooling systems that address the foregoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is an electrostatic air filter for electric wheel motors. To prevent particles and debris in outside air from entering into wheel motors, an electrostatic chuck, film, material, or device is incorporated into the vehicle wheel. This device can be operated in an attractive mode, wherein certain particles and debris are drawn toward the device, and tend to adhere to it while power is provided to the device (e.g., while the vehicle is moving). When power is removed from the device (e.g., when the vehicle is stopped), particles and debris may tend to fall away under the influence of gravity. The device can also be configured in a repulsive mode, wherein certain particles and debris are repelled from the device while power is provided (e.g., while the vehicle is moving). In either case, the flow of particles and debris through the wheel and into the motor is diminished, thus permitting the motor to operate with less risk of damage or shutdown, and less risk of reductions in power, efficiency, torque, or operating life that are associated with overheating. This electrostatic air filter may be used instead of, or in addition to, particulate air filters comprising porous or fibrous materials.

The electrostatic air filter disclosed herein has particular, but not exclusive, utility for removing particulates from wheel motor air intakes in cars and trucks. One general aspect of the electrostatic air filter includes a vehicle comprising a wheel; an air-cooled motor associated with the wheel; a ventilation path for passing outside air from outside the vehicle into the air-cooled motor; and an electrostatic device disposed proximate to the ventilation path, wherein, when the electrostatic device is energized, particles or debris in the outside air are attracted toward or repelled from the electrostatic device, such that the particles or debris are removed from the outside air before the outside air enters the motor. Other embodiments of this aspect include corresponding computer systems, apparatus, and computer programs recorded on one or more computer storage devices, each configured to perform actions required to operate the device.

Implementations may include one or more of the following features. The vehicle where the electrostatic device includes an electrostatic chuck, film, or coating. The vehicle where the electrostatic device includes a coulomb-force electrostatic chuck or a Johnsen-Rahbek electrostatic chuck. The vehicle where the electrostatic device is disposed on a hub, spoke, or rim of the wheel. The vehicle where the wiring operably couples the electrostatic device to an electrical system of the vehicle. The vehicle where the particles or debris include metal, metal oxide, semiconductor, semiconductor oxide, or organic material. The vehicle where the electrostatic device is energized while the vehicle is moving and de-energized while the vehicle is stopped. Implementations of the described techniques may include hardware, a method or process, or computer software on a computer-accessible medium.

One general aspect includes a motor, comprising an inlet through which cool air enters the motor; an outlet through which hot exhaust exits the motor; and an electrostatic device disposed within or proximate to a ventilation path of the inlet, where, when the electrostatic device is energized, particles or debris in the cool air are attracted toward or repelled from the electrostatic device, such that the particles or debris are removed from the cool air before the cool air enters the motor. Other embodiments of this aspect include corresponding computer systems, apparatus, and computer programs recorded on one or more computer storage devices, each configured to perform the actions of the methods.

Implementations may include one or more of the following features. The motor where the motor is a wheel motor of a vehicle. The electrostatic device includes an electrostatic chuck, film, or coating. The motor where the electrostatic device includes a coulomb-force electrostatic chuck or a Johnsen-Rahbek electrostatic chuck. The motor where the wiring operably couples the electrostatic device to an electrical system of the motor. The motor where the particles or debris include metal, metal oxide, semiconductor, semiconductor oxide, or organic material. The motor where the electrostatic device is energized while the motor is running and de-energized while the motor is stopped. Implementations of the described techniques may include hardware, a method or process, or computer software on a computer-accessible medium.

One general aspect includes a method comprising providing an air inlet to a motor, through which air enters the motor; providing a ventilation path to the air inlet; and providing an electrostatic device proximate to the ventilation path, such that, when the electrostatic device is energized, particles or debris in the air are attracted toward or repelled from the electrostatic device, such that the particles or debris are removed from the air before the air enters the motor. Other embodiments of this aspect include corresponding computer systems, apparatus, and computer programs recorded on one or more computer storage devices, each configured to perform the actions of the methods.

Implementations may include one or more of the following features. The method where the motor is a wheel motor of a vehicle. The method where the electrostatic device includes a coulomb-force electrostatic chuck or a Johnsen-Rahbek electrostatic chuck. The method where the particles or debris include metal, metal oxide, semiconductor, semiconductor oxide, or organic material. The method where the electrostatic device is energized while the motor is running and de-energized while the motor is stopped. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the electrostatic air filter, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Disclosed is an electrostatic air filter or particulate management system for electric motors, including but not limited to automotive electric wheel motors. To prevent particles and debris from outside air from entering into the air intake of a wheel motor, an electrostatic chuck, electrostatic film, electrostatic material, or electrostatic device is incorporated into one or more portions of the vehicle wheel. This device can be operated in an attractive mode, wherein certain particles and debris are drawn toward the device, and tend to adhere to the device while power is provided. This may occur for example while the vehicle is moving. When power is removed from the device (e.g., when the vehicle is stopped), particles and debris may tend to fall away from the electrostatic device (e.g., under the influence of gravity). The device may also be usable in a repulsive mode, wherein certain particles and debris are repelled from the device while power is provided (e.g., while the vehicle is moving). In either case, the flow of particles and debris through the wheel and into the wheel motor's air intake is diminished, thus preventing or reducing damage to the motor and permitting the motor to operate with less risk of shutdown and less risk of the reductions of power, efficiency, torque, or operating life that are associated with overheating due to reduced air flow. This electrostatic air filter may be used instead of, or in addition to, particulate air filters comprising porous or fibrous materials, screens, slats, or louvres, which may for example be positioned at the air intakes of the wheel motor.

The present disclosure aids substantially in the performance of electric and hybrid vehicles, by improving air flow through air-cooled electric wheel motors. Implemented as a wheel component, the electrostatic air filter disclosed herein provides a practical means to limit the flow of debris and particulates into the wheel motor air intakes. This improved air filtering transforms potentially contaminated intake air into air with particles or debris removed, without the normally routine need to incorporate replaceable mesh, fibrous, or porous filters into the motor air intakes. This unconventional approach improves the functioning of the electric motor, by reducing damage caused by debris and particulates, and by limiting blockage of air passages from debris and particulates. A control process of the electrostatic air filter may perform certain specific operations in response to different sensor inputs.

These descriptions are provided for exemplary purposes only, and should not be considered to limit the scope of the electrostatic air filter. Certain features may be added, removed, or modified without departing from the spirit of the claimed subject matter. For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
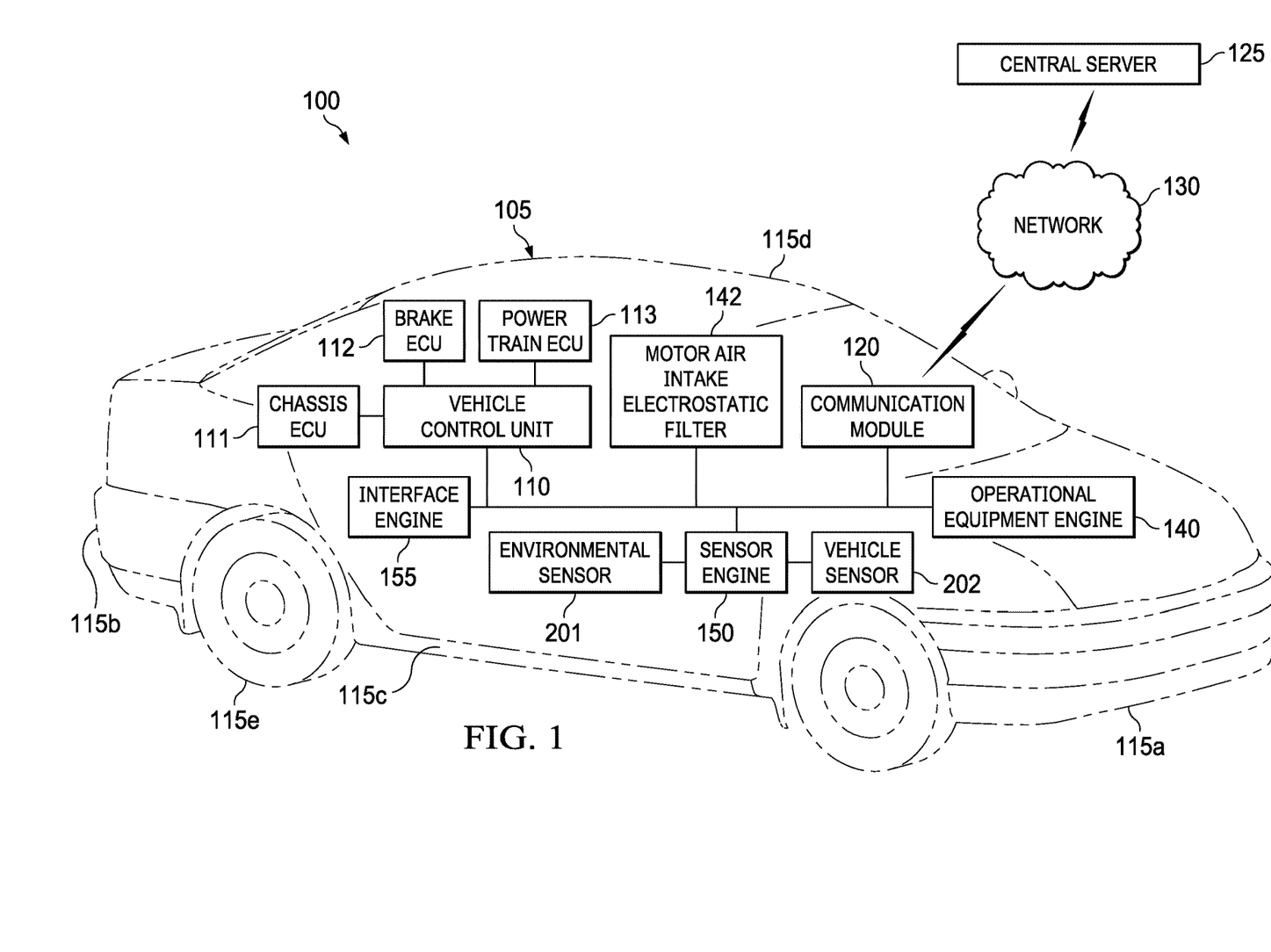
FIG. 1 is a diagrammatic illustration of an electrostatic motor air intake filtering system in accordance with at least one embodiment of the present disclosure.

FIG. 1 is a diagrammatic illustration of an electrostatic motor air intake filtering system in accordance with at least one embodiment of the present disclosure. In an example, an electrostatic motor air intake filtering system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may in some cases be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, or the interface engine 155 to at least partially control the interaction of data with and between the various components of the electrostatic motor air intake filtering system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a motor air intake electrostatic filter 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
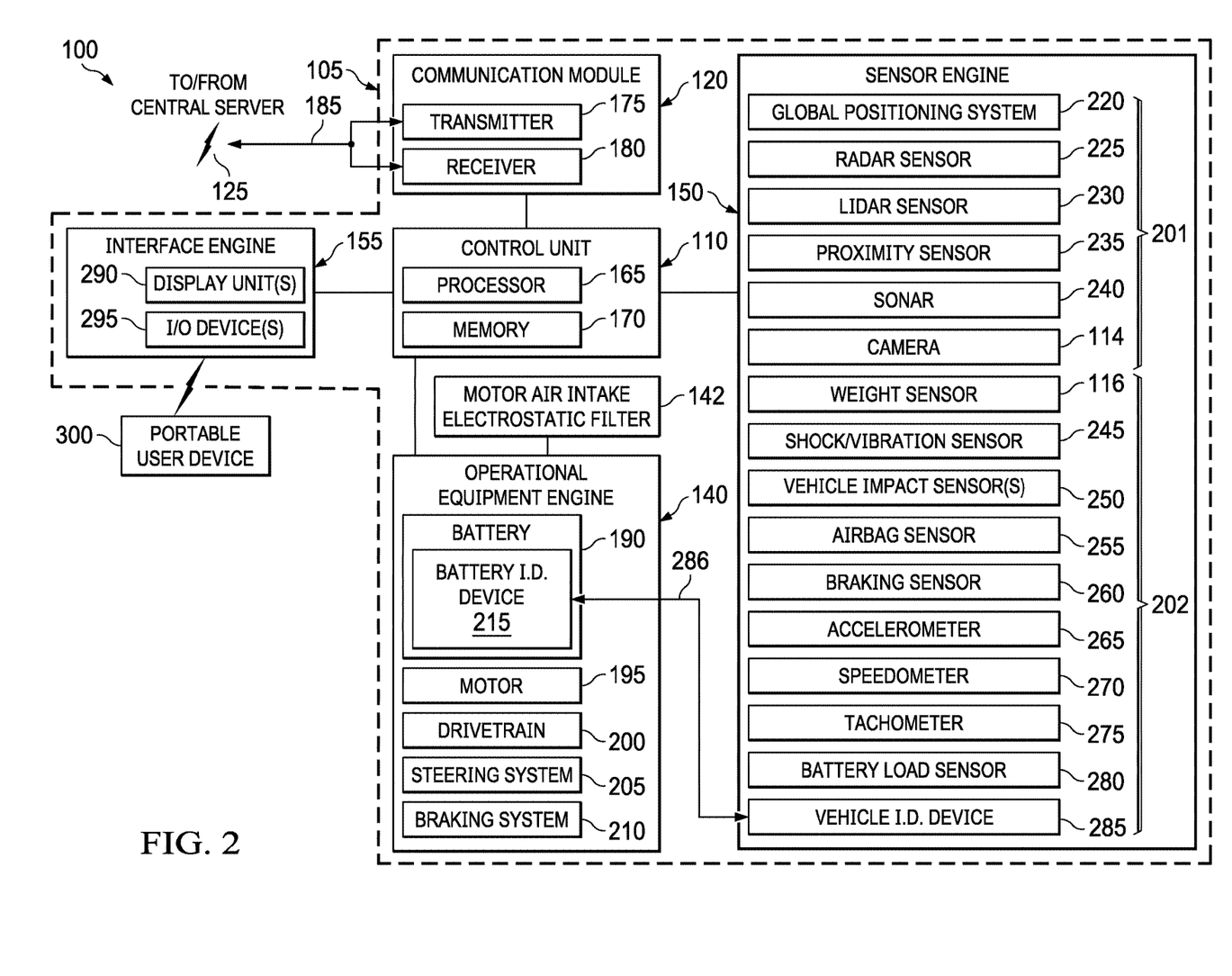
FIG. 2 is a diagrammatic illustration, in a block-diagram form, of at least a portion of the electrostatic motor air intake filtering system of FIG. 1, in accordance with at least one embodiment of the present disclosure.

FIG. 2 is a diagrammatic illustration, in a block-diagram form, of at least a portion of the electrostatic motor air intake filtering system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Such sensors may include, but are not limited to, angle sensors, rotary encoders, or linear encoders. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seat back, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The electrostatic motor air intake filtering system 100 also includes a motor air intake electrostatic filter 142, the operation of which will be described below. In some embodiments, the motor air intake electrostatic filter 142 comprises a standalone housing which may in some cases include a processor and memory. In other embodiments, the motor air intake electrostatic filter 142 may be operated by software, firmware, or hardware within another processor, such as the vehicle control unit 110, operational equipment engine 140, or power train ECU 113. The sensor engine 150 includes environmental sensors 201 and vehicle sensors 202. In an example, the motor air intake electrostatic filter 142 receives sensor data from one or more sensors.

A reader of ordinary skill in the art will understand that other components or arrangements of components may be found in a vehicle 105, and that the same general principles apply to electric vehicles, internal combustion vehicles, and hybrid vehicles.

Figure 3A:
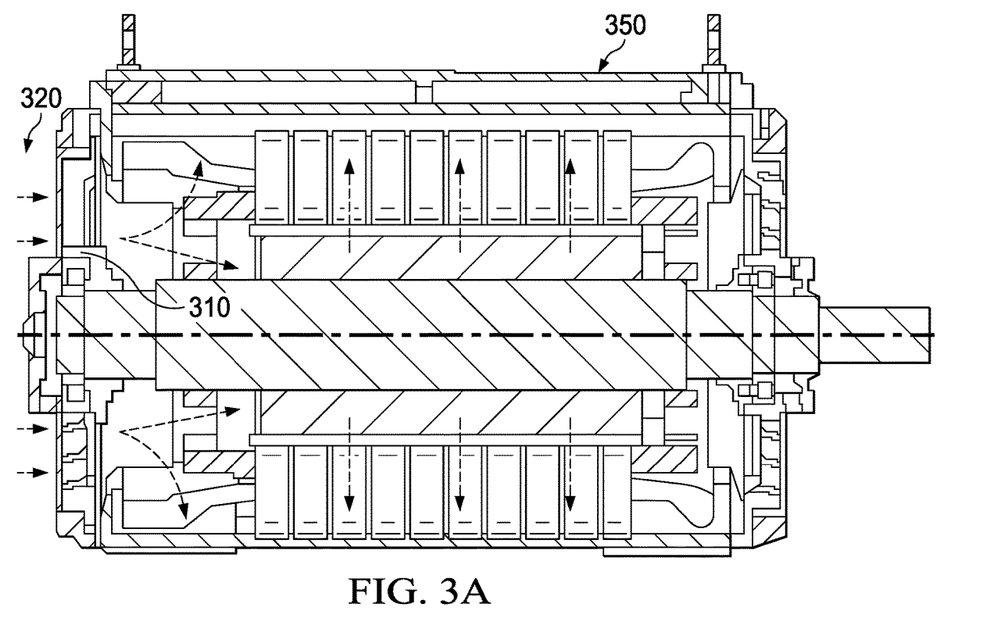
FIG. 3A is a side cross-sectional view of an air-cooled electric motor in accordance with aspects of the present disclosure.

FIG. 3A is a side cross-sectional view of an air-cooled electric motor 350 in accordance with aspects of the present disclosure. The motor 350 includes a fan 310 that draws in intake cooling air 320.

Figure 3B:
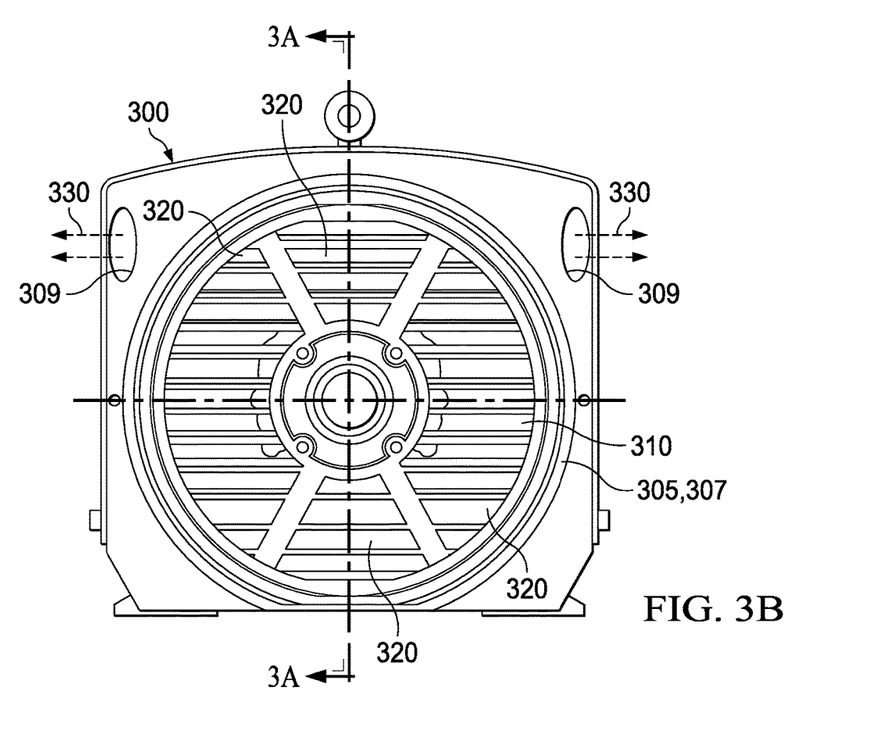
FIG. 3B is a front view of an air-cooled electric motor in accordance with aspects of the present disclosure.

FIG. 3B is a front view of an air-cooled electric motor 350 in accordance with aspects of the present disclosure. The motor 350 includes a fan 310 that draws in intake cooling air 320 through one or more inlets 307 and forces out hot exhaust 330 (e.g., air heated by the hot components of the motor, or exhaust containing air and other gases) through one or more outlets 309. The fan 310 is protected by a grill or grating 305 covering the inlet 307.

Figure 4:
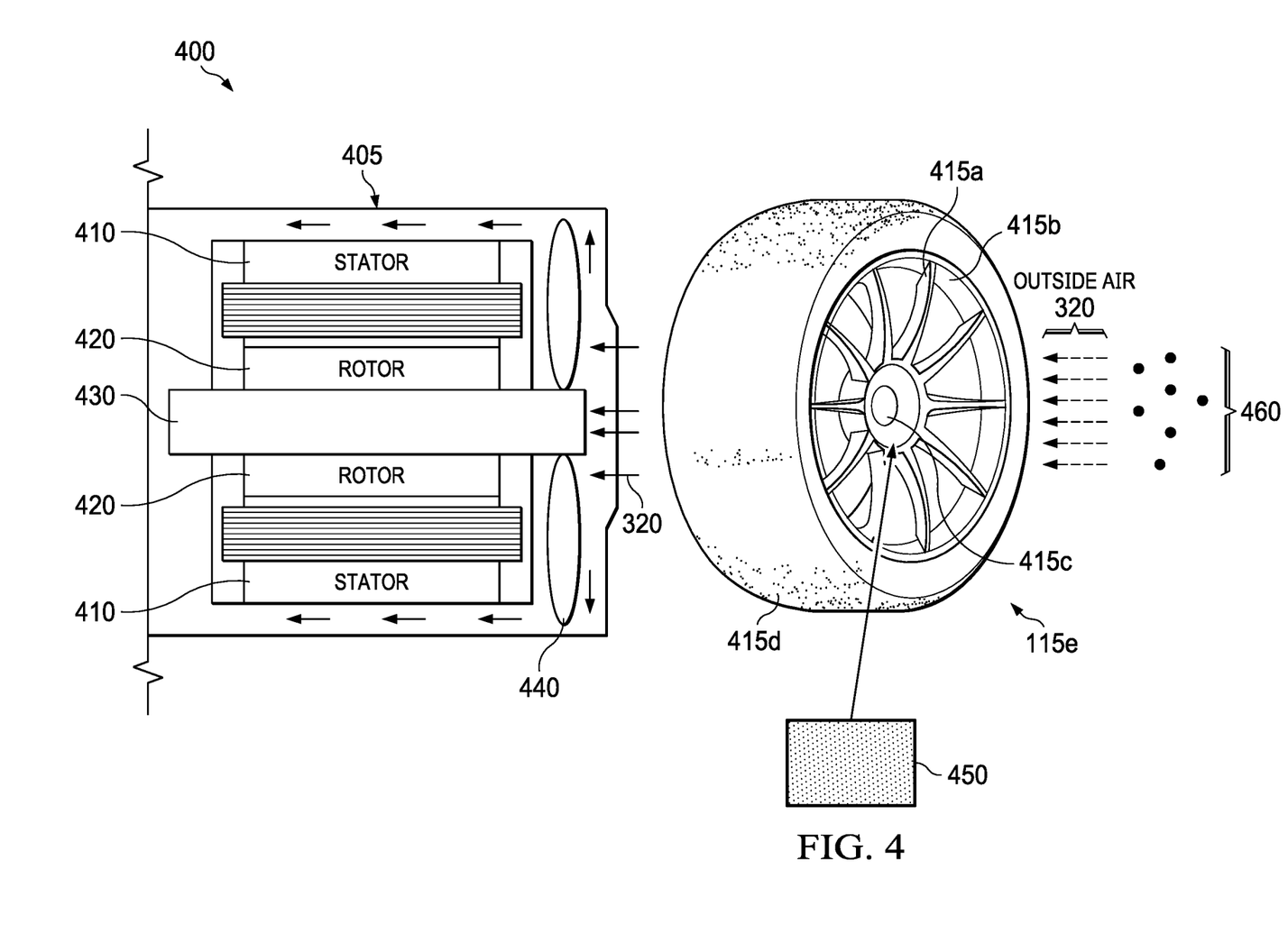
FIG. 4 is a diagrammatic illustration of an example vehicle wheel incorporating an air-cooled electric wheel motor and an electrostatic air filter in accordance with at least one embodiment of the present disclosure.

FIG. 4 is a diagrammatic illustration of an example vehicle wheel 115e incorporating an air-cooled electric wheel motor 400 and an electrostatic air filtering device 450 in accordance with at least one embodiment of the present disclosure. In this implementation, for clarity, only certain components are shown. However, other components, including those describe herein, are also contemplated as being a part of the vehicle wheel 115e shown in FIG. 4.

The electric motor 400 includes a housing 405, a stator 410 that remains fixed relative to the housing, and a rotor 420 that rotates relative to the housing to generate electric power. In the example shown in FIG. 4, an axle 430 turns both the rotor 420 and a fan 440. The fan 440 draws in cool air 320, which is then circulated inside the housing and expelled as hot exhaust air. The wheel 115e also includes spokes 415a that connect a rim 415b to a hub 415c, and a tire 415d that fits outside the rim 415b. In an example, cool outside air 320 flows into the motor 400 through the spokes 415a of the wheel 115e.

In the example shown in FIG. 4, an electrostatic chuck, coating, material, or device 450 is disposed on the hub 115c of the wheel 115e, such that when the electrostatic device 450 is energized, certain debris or particulates 460 in the outside air 320 are either attracted to the hub 415c or else repelled from the hub 415c, depending for example on the surface charge of the debris or particulates 460 and the charge state of the electrostatic device 450. The debris or particulates may for example include metal (e.g., debris or particles shed by vehicles), semiconductor (e.g., silicon), semiconductor oxide (e.g., particles of glass or sand), metal oxide (e.g., alumina, rust), or organic material (e.g., grass, leaves, or tire particles). As a result, the debris or particles are at least partially removed from the inflowing air 320, and thus the inflowing air 320 is at least partially filtered. In some embodiments, when the electrostatic device 450 is de-energized, this attractive or repulsive force disappears such that, for example, particles that had been clinging to the electrostatic device 450 may tend to fall away. In an example, the electrostatic chuck is energized while the vehicle is moving, and de-energized when the vehicle is stopped, although other arrangements may be used instead or in addition. In some embodiments, the electrostatic chuck or device 450 may retain a positive surface charge (whether positive, negative, or a pattern or combination thereof) even when de-energized.

Figure 5:
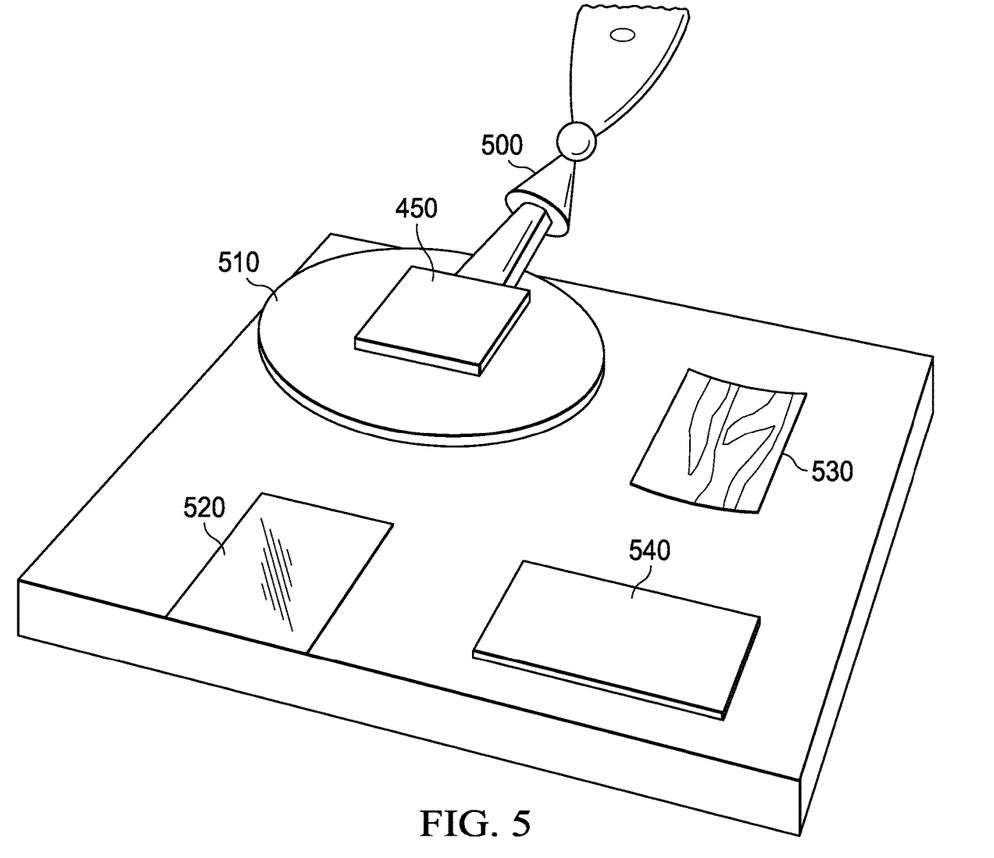
FIG. 5 is a perspective view of an electrostatic manipulator in accordance with aspects of the present disclosure.

FIG. 5 is a perspective view of an electrostatic manipulator 500 in accordance with aspects of the present disclosure. The manipulator 500 includes an electrostatic chuck or end effector 450. When the chuck or end effector 450 is energized, it is capable of lifting small objects made of semiconductor 510 (e.g., a silicon or gallium arsenide wafer), semiconductor oxide 520 (e.g., a glass slide), metal (e.g., copper foil), or organic material (e.g., a paper card composed largely of cellulose). In a manufacturing setting, such manipulators 500 can be used in place of vacuum manipulators for the handling of small objects or to collect metal particles or other debris. Various types of electrostatic chucks exist, including but not limited to Coulomb-force electrostatic chucks and Johnsen-Rahbek electrostatic chucks.

Figure 6:
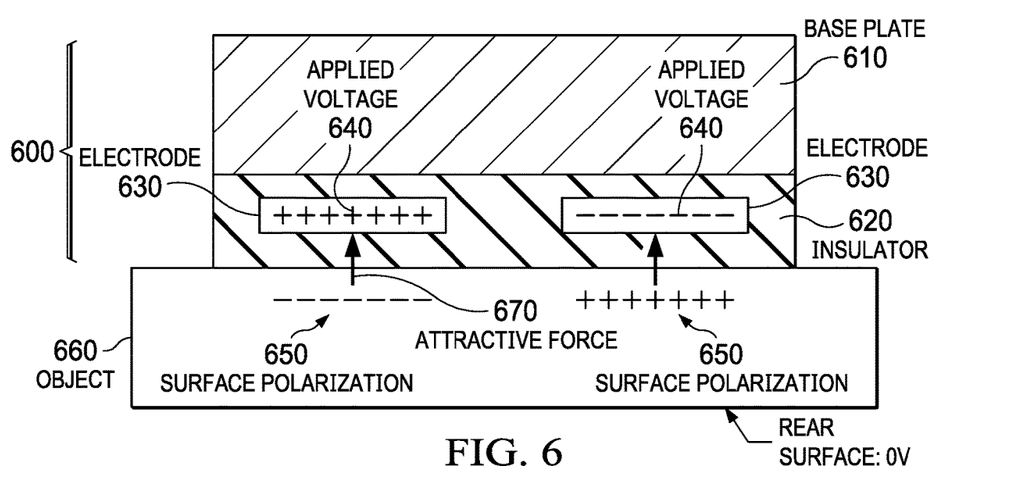
FIG. 6 is a schematic, cross-sectional side view of an electrostatic chuck, film, coating, or device in accordance with at least one embodiment of the present disclosure.

FIG. 6 is a schematic, cross-sectional side view of an electrostatic chuck, film, coating, or device 600 in accordance with at least one embodiment of the present disclosure. In the example shown in FIG. 6, the electrostatic device 600 includes a base plate 610 covered by an insulator 620, in which electrodes 630 are embedded. When a voltage 640 is applied between two electrodes 630, one electrode 630 becomes positively charged, while the other electrode 630 becomes negatively charged. These charges can then cause surface polarization 650 in a nearby object 660, thus creating an attractive force 670. This is possible even when no net charge is imparted to the object 660. However, other arrangements of electrostatic components can be used instead or in addition to the arrangement shown in FIG. 6, including arrangements that impart a net static charge (whether positive or negative) to the object 660, without departing from the spirit of the present disclosure.

Figure 7:
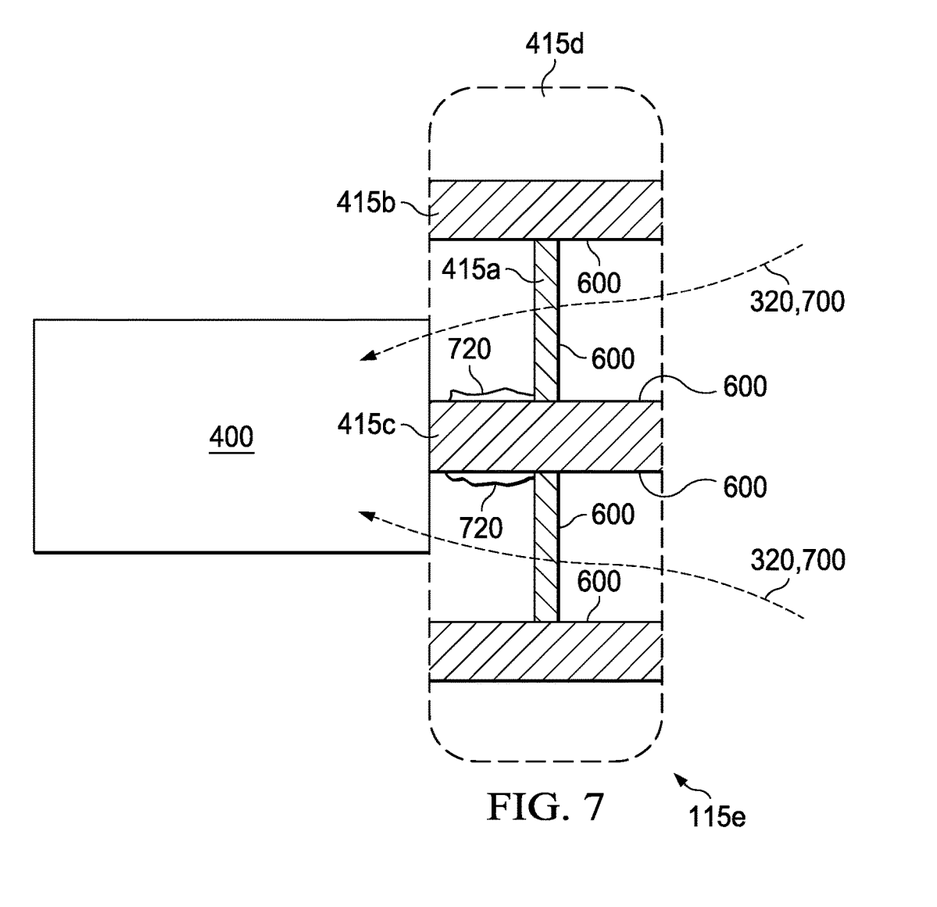
FIG. 7 is a schematic, cross-sectional view of a vehicle wheel incorporating an air-cooled electric motor and one or more electrostatic chucks, films, coatings, or devices, in accordance with at least one embodiment of the present disclosure.

FIG. 7 is a schematic, cross-sectional view of a vehicle wheel 115e incorporating an air-cooled electric motor 400 and one or more electrostatic chucks, films, coatings, or devices 600, in accordance with at least one embodiment of the present disclosure. Visible are the wheel 115e, spokes 415a, rim 415b, hub 415c, and tire 415d. Cool outside air 320 is drawn into the motor 400 through the wheel 115e (for example, through the spokes 415a). The path or paths taken by the cool outside air 320 may be referred to as a ventilation path 700.

In order to limit the intrusion of debris and particulates into the motor 400, one or more electrostatic chucks, films, coatings, or devices 600 may be placed at various locations on or within the wheel 115e, either directly within the ventilation path 700 or proximate to the ventilation path 700 (e.g., within 10 centimeters, 30 centimeters, or 60 centimeters of the ventilation path). The electrostatic devices 600 may be rigid, flexible, or any combination thereof. For example, depending on the implementation, electrostatic devices 600 may be disposed on or within the spokes 415a, rim 415b, hub 415c, inlet 307 (as shown for example in FIG. 3B), or other locations as appropriate to achieve the result of limiting the intrusion of debris or particles into the motor 400. Devices 600 may for example be placed on either the outside of the hub 415c or on the outer end of the hub 415c, as shown. In some embodiments, the electrostatic devices are powered or controlled by wiring 720, that may interface with other vehicle components such as the VCU 110, sensor engine 150, or operational equipment engine 140 (shown for example in FIG. 2).

As will be readily appreciated by those having ordinary skill in the art after becoming familiar with the teachings herein, the electrostatic air filter advantageously protects the air-cooled wheel motor from the intrusion of particulates and debris, by attracting or repelling solid objects in the incoming stream of cooling air before they can enter the motor. A number of variations are possible on the examples and embodiments described above. For example, the electrostatic chucks, films, coatings, or devices can vary in size, shape, position, mechanism of operation, and mode of operation without departing from the spirit of the present disclosure. Multiple electrostatic chucks may be provided in a single wheel. The technology described herein may be applied to myriad different vehicle types, including internal combustion, electric, and hybrid vehicles, cars, trucks, motorcycles, and other vehicles, and may also be applied to air-cooled devices other than automotive wheel motors. For example, the technology may be applied to other types of electric motors, or other air-cooled devices or air-breathing combustion devices (e.g., for filtering combustion air drawn into internal or external combustion engines) that may be subject to ingestion of debris or particulates.

The logical operations making up the embodiments of the technology described herein are referred to variously as operations, steps, objects, elements, components, or modules. It should be understood that these may be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the electrostatic air filter. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the electrostatic air filter as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A motor, comprising:
    an inlet through which cool air enters the motor;
    an outlet through which hot exhaust exits the motor; and
    an electrostatic chuck disposed proximate to a ventilation path of the inlet,
    wherein, when the electrostatic chuck is energized, particles or debris in the cool air are attracted toward the electrostatic chuck,
    such that the particles or debris are removed from the cool air before the cool air enters the motor,
    wherein the particles or debris comprise metal oxide, semiconductor, semiconductor oxide, or organic material.

2. The motor of claim 1, wherein the motor is a wheel motor of a vehicle.

3. The motor of claim 1, wherein the electrostatic chuck comprises an a base plate covered by an insulator in which electrodes are embedded.

4. The motor of claim 1, wherein the electrostatic chuck comprises a Coulomb-force electrostatic chuck or a Johnsen-Rahbek electrostatic chuck.

5. The motor of claim 1, further comprising wiring, wherein the wiring operably couples the electrostatic chuck to an electrical system of the motor.

6. The motor of claim 1, wherein the particles or debris further comprise metal.

7. The motor of claim 1, wherein the electrostatic chuck is configured to be energized while the motor is running and de-energized while the motor is stopped.

8. A method, comprising:
    providing an air inlet to a motor, through which air enters the motor;
    providing a ventilation path to the air inlet; and
    providing an electrostatic chuck proximate to the ventilation path,
    such that, when the electrostatic chuck is energized, particles or debris in the air are attracted toward the electrostatic chuck,
    such that the particles or debris are removed from the air before the air enters the motor,
    wherein the particles or debris comprise metal oxide, semiconductor, semiconductor oxide, or organic material.

9. The method of claim 8, wherein the motor is a wheel motor of a vehicle.

10. The method of claim 8, wherein the electrostatic chuck comprises a Coulomb-force electrostatic chuck or a Johnsen-Rahbek electrostatic chuck.

11. The method of claim 8, wherein the particles or debris comprise metal.

12. The method of claim 8, wherein the electrostatic chuck is energized while the motor is running and de-energized while the motor is stopped.

13. The method of claim 8, wherein the electrostatic chuck comprises a base plate covered by an insulator in which electrodes are embedded.

* * * * *